United States Patent [19]
Ouchi

[11] Patent Number: 5,572,586
[45] Date of Patent: Nov. 5, 1996

[54] COMMUNICATION CONTROL APPARATUS AND METHOD AND COMMUNICATION EXCHANGE APPARATUS AND METHOD

[75] Inventor: Masatomo Ouchi, Kawasaki, Japan

[73] Assignee: Canon Kabushiki Kaisha, Tokyo, Japan

[21] Appl. No.: 35,191

[22] Filed: Mar. 22, 1993

[30] Foreign Application Priority Data

Mar. 27, 1992 [JP] Japan .................................. 4-101705

[51] Int. Cl.⁶ .................................................. H04M 3/00
[52] U.S. Cl. .......................... 379/246; 379/234; 379/242
[58] Field of Search .................................. 379/157, 209, 379/234, 164, 242, 165, 245, 166, 246, 232, 243, 233, 245, 373, 374, 375, 156, 158, 159, 160, 161, 162, 163, 94, 221, 67, 112, 92, 265, 266, 218, 133, 134, 137, 138, 139, 234, 219, 34, 220, 113

[56] References Cited

U.S. PATENT DOCUMENTS

| | | | |
|---|---|---|---|
| 4,594,477 | 6/1986 | Noirot | 379/221 |
| 4,646,347 | 2/1987 | Liu | 379/375 |
| 4,782,518 | 11/1988 | Mattley et al. | 379/201 |
| 4,951,310 | 8/1990 | Honda et al. | 379/266 |
| 4,991,203 | 2/1991 | Kakizawa | 379/209 |
| 4,998,273 | 3/1991 | Nichols | 379/102 |
| 5,020,099 | 5/1991 | Katagawa | 379/257 |
| 5,023,868 | 6/1991 | Davidson et al. | 379/94 |
| 5,029,202 | 7/1991 | Doembach, Jr. et al. | 379/201 |
| 5,033,079 | 7/1991 | Catron et al. | 379/127 |
| 5,040,209 | 8/1991 | Greenberg et al. | 379/373 |
| 5,046,181 | 9/1991 | Higuchi et al. | 379/241 |
| 5,056,132 | 10/1991 | Coleman et al. | 379/88 |
| 5,070,525 | 12/1991 | Szlam et al. | 379/221 |
| 5,086,458 | 2/1992 | Bowen | 379/386 |
| 5,144,653 | 9/1992 | Masuoka | 379/266 |
| 5,153,908 | 10/1992 | Kakizawa et al. | 379/157 |
| 5,164,983 | 11/1992 | Brown et al. | 379/112 |
| 5,200,992 | 4/1993 | Yoshino | 379/93 |
| 5,214,688 | 5/1993 | Szlam et al. | 379/67 |
| 5,230,017 | 7/1993 | Alexander | 379/164 |
| 5,337,352 | 8/1994 | Kobayashi et al. | 379/221 |

FOREIGN PATENT DOCUMENTS

2150147 6/1990 Japan .

*Primary Examiner*—Krista M. Zele
*Assistant Examiner*—Scott Wolinky
*Attorney, Agent, or Firm*—Fitzpatrick, Cella, Harper & Scinto

[57] ABSTRACT

A telephone control apparatus connected to an exchange accommodating a plurality of lines. The apparatus calls a connected communication terminal in accordance with a calling signal inputted from the exchange. In the apparatus, response information corresponding to the type of calling signals is stored in RAM 12 in advance. The type of a calling signal inputted from the exchange is discriminated, and response information is read out of the RAM12 in accordance with the discrimination result, to determine a corresponding response process. Further, a telephone exchange apparatus which accommodates a plurality of outside lines and which selects and seizes one of the outside lines by outgoing calling from an extension. Upon outgoing call operation from an extension, the stored information is referred to and one of the plurality of outside line is selected based upon a number of incoming calls received on each of the outside lines or the time period each one of the outside lines has been occupied in communication. The selected outside line and the extension as an outgoing call originator are connected.

15 Claims, 8 Drawing Sheets

|  | IDENTIFICATION NO. | RESPONSE METHOD |
|---|---|---|
| OUTSIDE LINE 1 | 1<br>2<br>3 | LOCALIZED<br>AUDIO<br>NORMAL |
| OUTSIDE LINE 2 | 1<br>2<br>3 | LOCALIZED<br>AUDIO<br>TRANSFER |
| OUTSIDE LINE n |  |  |

FIG. 6

| OUTSIDE LINE | NUMBER OF INCOMING-CALLS | TOTAL COMMUNICATION TIME BY INCOMING-CALLS (Min.) | AVERAGE COMMUNICATION TIME BY INCOMING-CALLS (Min.) | NUMBER OF OUTGOING-CALLS | TOTAL COMMUNICATION TIME BY OUTGOING-CALLS (Min.) | AVERAGE COMMUNICATION TIME BY OUTGOING-CALLS (Min.) |
|---|---|---|---|---|---|---|
| 1 | 51 | 243 | 4.8 | 61 | 120 | 2.0 |
| 2 | 13 | 2 | 6.5 | 71 | 181 | 2.5 |
| ---- | ---- | ---- | ---- | ---- | ---- | ---- |
| n | 35 | 105 | 3.0 | 31 | 62 | 2.0 |

COMMUNICATION CONTROL APPARATUS AND METHOD AND COMMUNICATION EXCHANGE APPARATUS AND METHOD

BACKGROUND OF THE INVENTION

The present invention relates to a telephone control apparatus and a method for a key telephone apparatus which generates an incoming call tone in accordance with a calling signal from a private branch exchange (PBX), and to a telephone exchange apparatus and a method for accommodating a plurality of outside lines and for seizing an arbitrary outside line of the plurality of outside lines.

Conventionally, a PBX discriminates whether an incoming call is from an outside line or from an extension to call a destination extension. A key telephone connected to the PBX rings utilizing current by a calling signal from the PBX or generates an incoming call tone utilizing a power source and a sound source equipped with the telephone. The telephone slightly changes the incoming call tone so that users can discriminate whether the call is from one of the outside lines and the call is from one of the extensions, however, improved methods for generating various incoming call tones for more effective usage of telephones have been desired.

In a key telephone accommodating a plurality of outside lines, an outside line is seized from idle status by going off-hook or pressing of a speaker key. In seizing the outside line, an idle outside line is selected in the order of numbers assigned to outside line keys, or an outside line except a line which has been used at a previous call is selected. However, in such a key telephone, selection of outside line is uniform, and whether or not the outside line is being called is not considered. For this reason, trouble does occur when the user erroneously makes an outgoing call onto an outside line on which an incoming call has arrived.

SUMMARY OF THE INVENTION

The present invention has been made in consideration of the above situation, and has as its object to provide a telephone control apparatus and a method for changing incoming call tones in accordance with calling signals.

Another object of the present invention is to provide a telephone exchange apparatus and a method for selecting an outside line more effectively.

Further object of the present invention is to provide a telephone control apparatus and a method for enabling users to discriminate an originator of incoming call by listening to an incoming call tone.

According to the present invention, the foregoing objects are attained by providing a telephone control apparatus connected to an exchange accommodating a plurality of lines, the apparatus for calling a communication terminal connected to the apparatus in accordance with a calling signal inputted from the exchange, comprising: discrimination means for discriminating a type of the calling signal inputted from the exchange; memory means for storing response information to the calling signal corresponding to the type of the calling signal; and determination means for reading response information out of the memory means in accordance with the discrimination result by the discrimination means, and determining a response process to the calling signal from the exchange.

Another object of the present invention is to provide a telephone exchange apparatus and a method for effectively selecting an outside line to be used from a plurality of outside lines to improve incoming call seizing rate.

According to the present invention, the foregoing object is attained by providing a telephone exchange apparatus which accommodates a plurality of outside lines and which selects one of the outside lines for an outgoing call from an extension and seizes the selected outside line, comprising: memory means for storing information relating to the number of incoming calls or time of communication on each of the plurality of outside lines; selection means for referring to the information stored in the memory means by the outgoing call from the extension and selecting one of the plurality of outside lines; and connecting means for connecting the outside line selected by the selection means and the extension which is an outgoing call originator.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

Figure 1:
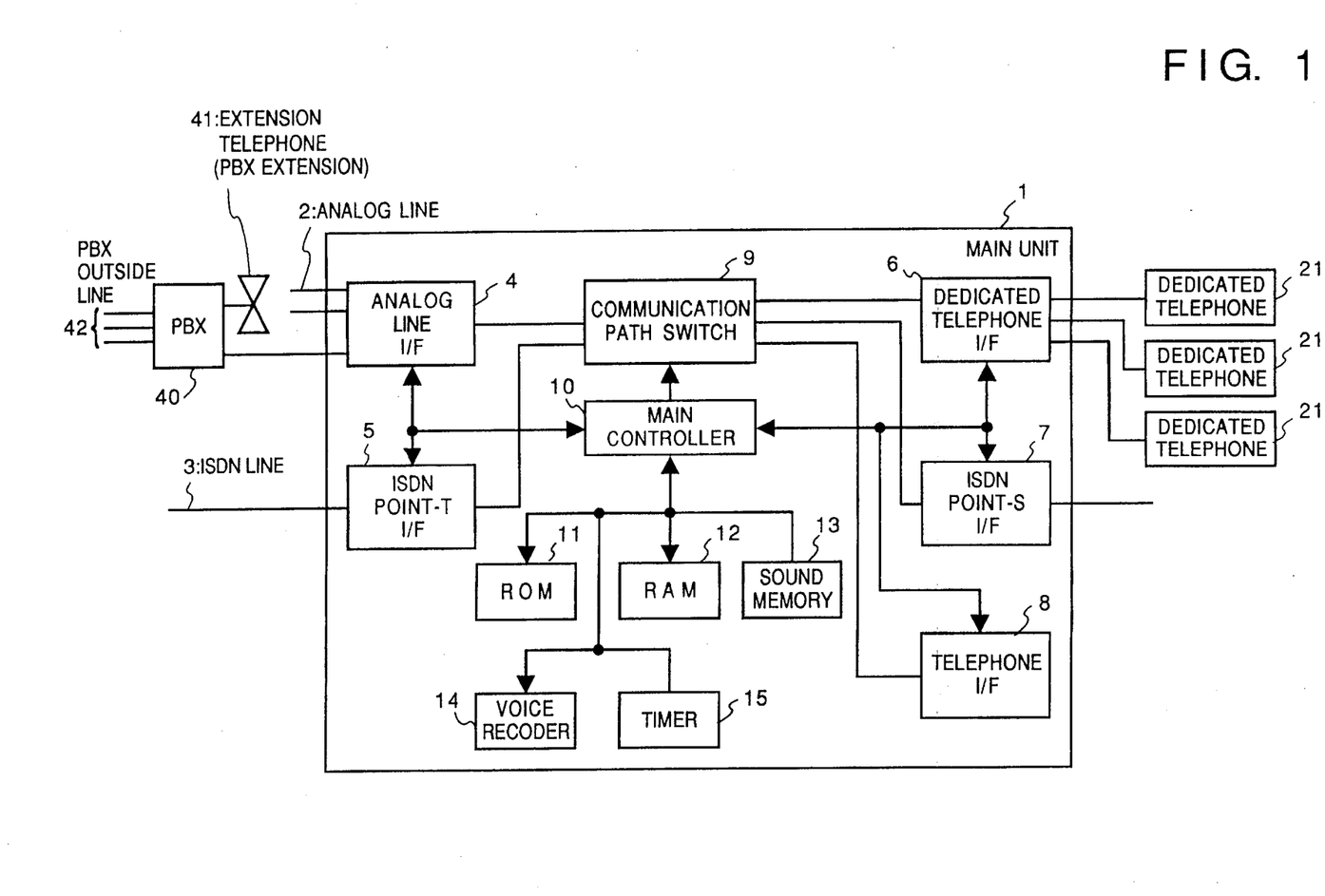
FIG. 1 is a block diagram showing the configuration of a telephone system in a first embodiment of the present invention.

FIG. 1 is a block diagram showing the configuration of a telephone system including a key telephone apparatus according to a first embodiment of the present invention. This telephone system accommodates a plurality of outside lines and extensions.

In the embodiment, a key telephone main unit 1 accommodates a plurality of analog lines 2 and a plurality of ISDN lines 3. The configuration of the main unit 1 will be described below. Reference numeral 4 denotes an analog line interface for transmitting dialing signals to the analog lines 2 and detecting incoming calls from the analog lines 2; 5, a T-reference point interface for ISDN lines 3; 6, a dedicated telephone interface for accommodating dedicated telephones as extension telephones; 7, a S-reference point interface for the ISDN lines 3; 8, a telephone interface for accommodating telephones and facsimile apparatuses which are not dedicated telephones and apparatuses; and 9, a communication switch for connecting a communication path between an outside line and an extension or between extensions.

Numeral 10 denotes a main controller for controlling the main unit 1 of the key telephone apparatus. The main controller 10 comprises a CPU such as a microprocessor. Numeral 11 denotes a ROM in which control programs for control processes of the main unit 1 are stored; 12, a RAM which is used as a work area of the main controller 10, and in which operating data of the telephone system, various data set at each terminal such as a telephone and a facsimile, and charging information per each terminal are stored; 13, a sound memory in which sound-source data for tones such as a holding tone and a dialing tone are stored; 14, a voice recorder for recording speeches in communication or reproducing a pre-stored response message by instructions from the main controller 10; and 15, a timer for measuring time so that the main controller 10 may perform "time-out" indicating elapse of a predetermined period of time.

The key telephone apparatus is connected to a PBX 40 via one of outside lines accommodated in the analog line interface 4. The PBX 40 accommodates PBX outside lines 42 and an extension telephone 41. The PBX 40 transmits a calling signal to the main unit 1 in case of incoming call. Signal pattern of the calling signal differs depending upon from where the incoming call arrives, i.e., from the outside line 42 or from the extension telephone 41.

Figure 2:
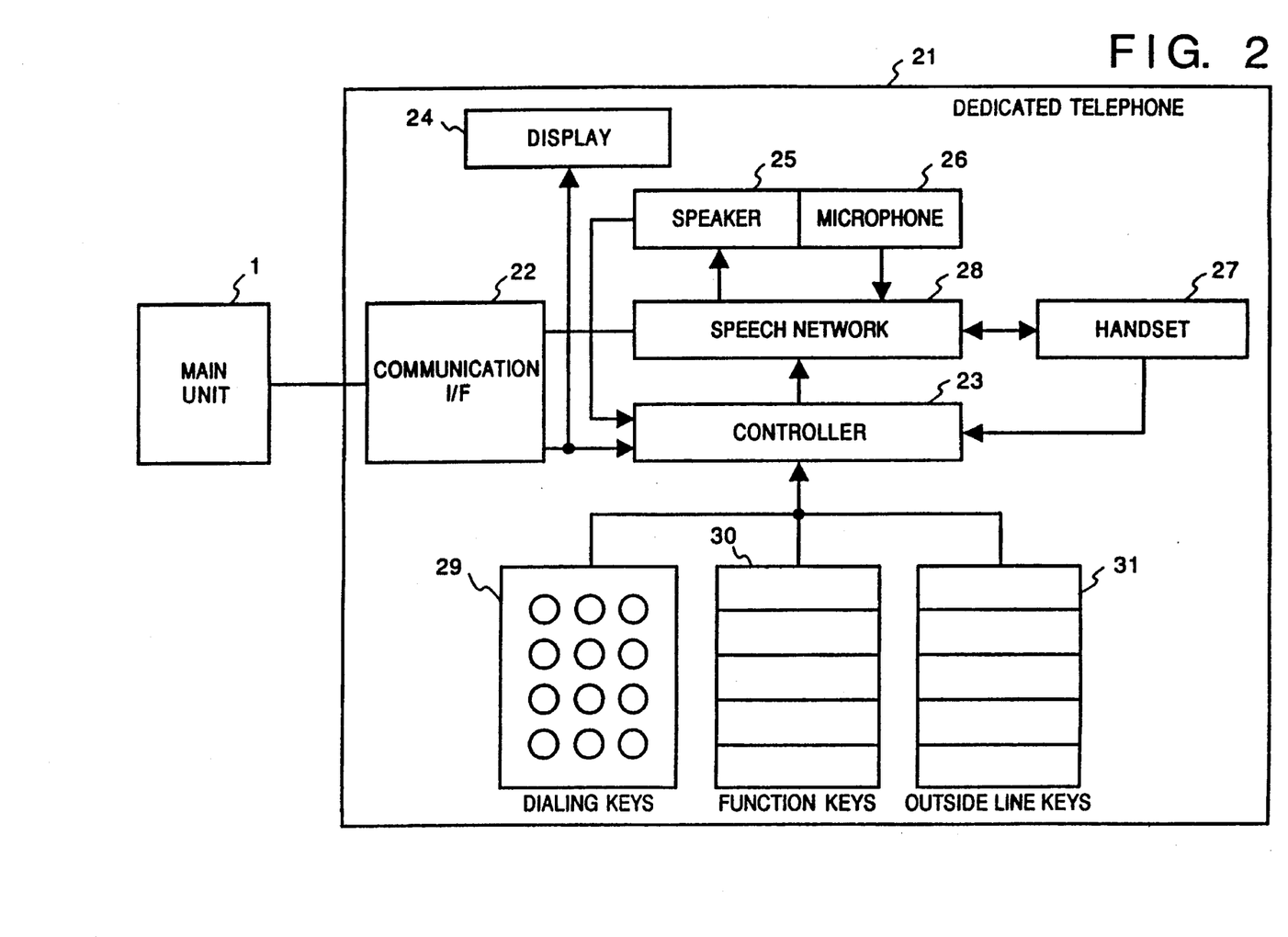
FIG. 2 is a block diagram showing the configuration of a dedicated telephone in the first embodiment.

On the other hand as shown in FIG. 2, the dedicated telephone 21 accommodated in this key telephone apparatus comprises a communication interface 22 for establishing a control channel and an information channel between the main unit 1, a controller 23 for controlling the operations of the dedicated telephone 21, a display 24 for displaying various information such as a dialing number, a speaker 25 for amplifying a received voice, a microphone 26 for hands-free communication (communication without holding a handset), a handset 27 for communication, a speech network 28 for switching communication to the speaker 25, the handset 27 or the microphone 26. The dedicated telephone 21 further comprises dialing keys 29, function keys 30 used upon holding a line or setting various data, and outside line keys 31 used for seizing an outside line or responding to an incoming call from an outside line.

In this embodiment, a user of the key telephone apparatus sets the following data to the main unit 1 in advance using the dialing keys 29 of the dedicated telephone 21 by referring to the display 24.

(1) Setting of Calling Signal Pattern

Figure 3:
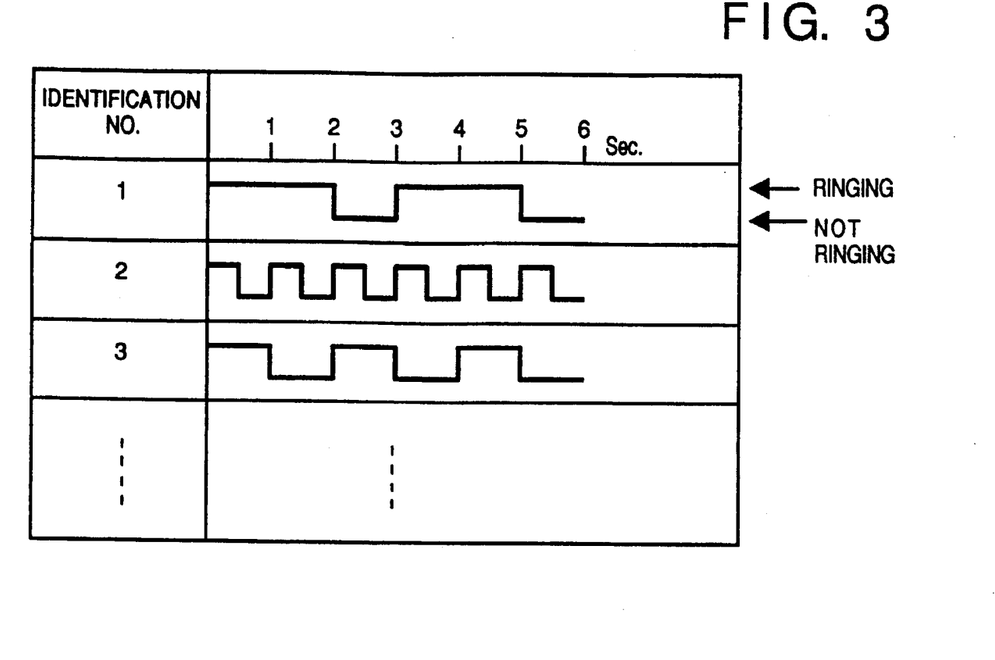
FIG. 3 is a diagram showing the relation between calling signal patterns and identification numbers in the first embodiment.

As described above, the calling signal pattern transmitted by the PBX 40 to the main unit 1 is different corresponding to whether an incoming call is from the outside line 42 or from the extension telephone 41. FIG. 3 shows examples of the signal patterns to which identification numbers are assigned. Note that it is assumed that the PBX 40 is connected to outside line No. 1 of the analog line interface 4 and other outside lines No. 2 and No. 3 are connected to other lines or extension lines (not shown).

The signal patterns have ON/OFF switchings with 0.5 second as the shortest duration. For example, the pattern of the identification No. 1 becomes ON (ringing) for two seconds and becomes OFF (not ringing) for one second. If the analog line interface 4 receives a signal from the PBX 40 connected to the outside line No. 1 and the signal becomes ON (current flows) for two seconds and becomes OFF (current does not flow) for one second, the analog line interface 4 determines that the incoming call of identification No. 1 has been received from the outside line No. 1.

(2) Setting of Incoming-Call Mode

Figure 4:
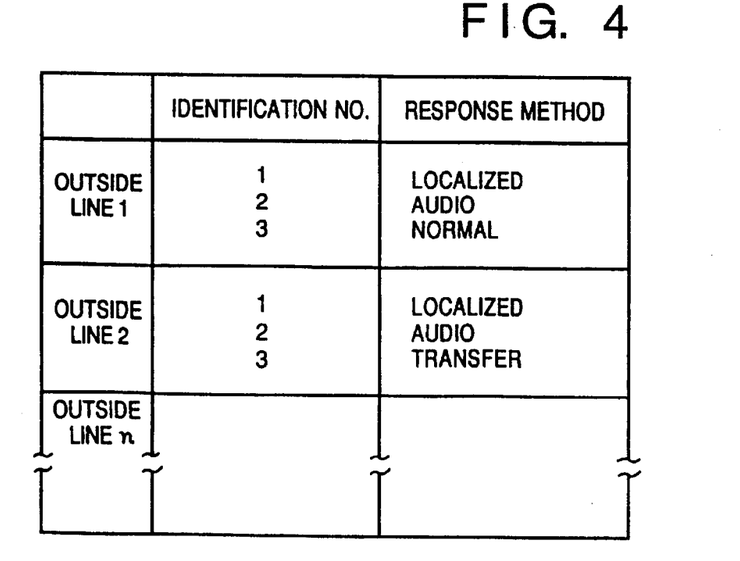
FIG. 4 illustrates an example of a table for setting a response method corresponding to the identification numbers in the first embodiment.

FIG. 4 shows an example of response methods corresponding to the identification numbers. The identification numbers and corresponding response methods are set using the dialing keys 29, the function keys 30 and the outside line keys 31 of the dedicated telephone 21 and stored into the RAM 12.

If there is an incoming call on the outside line No. 1 via the PBX 40 and the calling signal pattern corresponds to the pattern of the identification No. 1, the response method is set to "localized response" (terminals are divided into several groups, and all terminals within the same group ring at an incoming call to the group). It should be noted that in this embodiment, simple setting examples are shown, however, more complicated setting operations, e.g., changing incoming-response method based on time zone can be employed.

Next, the response process by the main controller 10 based on the data in FIG. 4 will be described with reference to a flowchart of FIG. 5. In the following explanation, "event", means occurrences of things such as an incoming call from an outside line, time-out by the timer 15, and an operation by the user (holding/hanging-up of the handset etc.), "status" means status of waiting for "event" and "idle status" is status in which terminals such as telephones are not being used and the terminals have not received any incoming call. The control program for performing the process shown in FIG. 5 is stored in the ROM 11.

Figure 5:
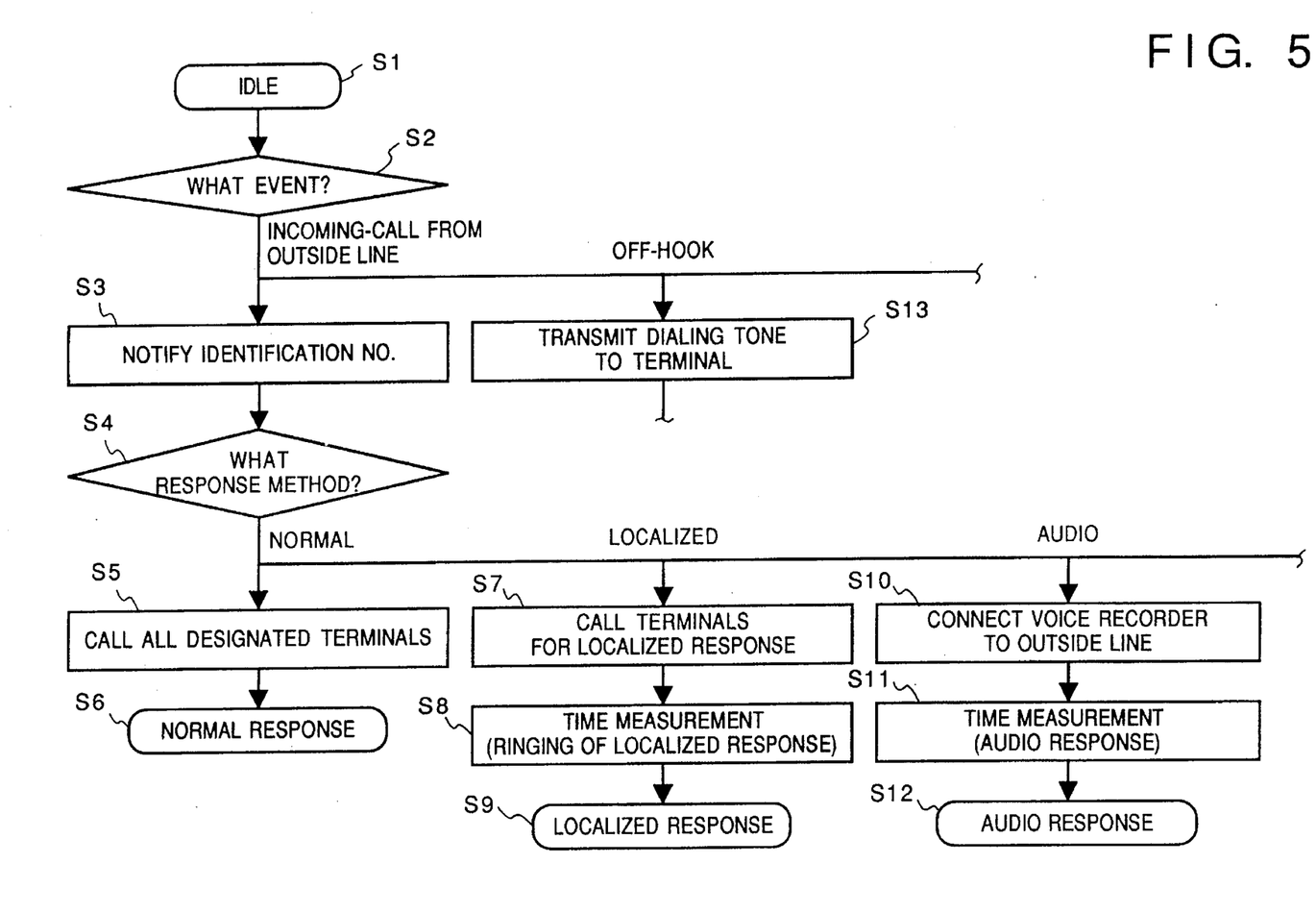
FIG. 5 is a flowchart showing response processes corresponding to the identification numbers in the first embodiment.

Further, the process in FIG. 5 is performed by the main controller 10 which manages statuses of the respective terminals connected via the dedicated telephone interface 6, the ISDN point-S interface 7 and telephone interface 8.

In step S1, all the terminals are in idle status and occurrence of event is awaited in step S2. If the analog line interface 4 detects calling from an outside line (outside line No. 1), the signal pattern inputted from the outside line No. 1 is recognized, and corresponding identification number (identification No.1) is notified to the main controller 10 with information indicating the kind of the event. In step S3, the main controller 10 is informed that the event is an incoming call from the outside line No. 1 and its identification number is "1". In step S4, a table as shown in FIG. 4 is referred to and a corresponding response method (in this case, the localized response) is determined from the number of the outside line (the outside line No. 1) and the identification No. 1.

If the response method is "normal", the process proceeds to step S5 in which all the designated terminals are called. In step S6, the current status of the apparatus becomes "normal incoming call". If the response method is "localized" in step S4, the process proceeds to step S7 in which terminals designated as destinations for the localized response are called. In step S8, time period till the ringing indicating the localized response will be stopped is set to the timer 15, and the timer 15 starts measurement. In step S9, the current status becomes "localized response".

If the response method is "audio response" in step S4, the process proceeds to step S10 in which the outside line is connected to the voice recorder 14 and a corresponding response message is transmitted to the caller. In step S11, time for transmitting the response message is set to the timer 15 and time measurement by the timer 15 is started. In step S12, the current status becomes "audio response".

It should be noted that there are response methods other than the above-described three methods, e.g., "slide" "DID (direct in dialing)", and "DIL (direct in line)", and these methods can be freely set and operated.

Further, if the event is not an incoming call from outside line in step S2, e.g., off-hook of a terminal, the process proceeds to step S13 in which dialing tone is transmitted to the terminal. The subsequent operations are the same as conventional operations and the explanations will be omitted.

The present invention is not limited to the above-described embodiment. For example, it can be arranged such that the analog line interface 4 only notifies ON/OFF of calling current to the main controller 10 and the main controller 10 performs pattern recognition of the input signal. Further, in which embodiment, the shortest duration of signal pattern is set to 0.5 second, however, the present invention is not limited to this arrangement. The shortest duration can be changed depending on circumstances.

<Second Embodiment>

Next, a second embodiment of the present invention will be described below. It should be noted that the basic structure of the key telephone apparatus in this embodiment is similar to that in the first embodiment (FIG. 1), therefore, corresponding parts are numbered like reference numerals in the explanations.

In the key telephone apparatus in the second embodiment, when an outgoing call is made to an outside line, data for each outside line and data for each terminal (telephone) are referred to in order to determine priorities of the outside lines and to select an outside line to be used. This data is stored in the RAM 12.

Figure 6:
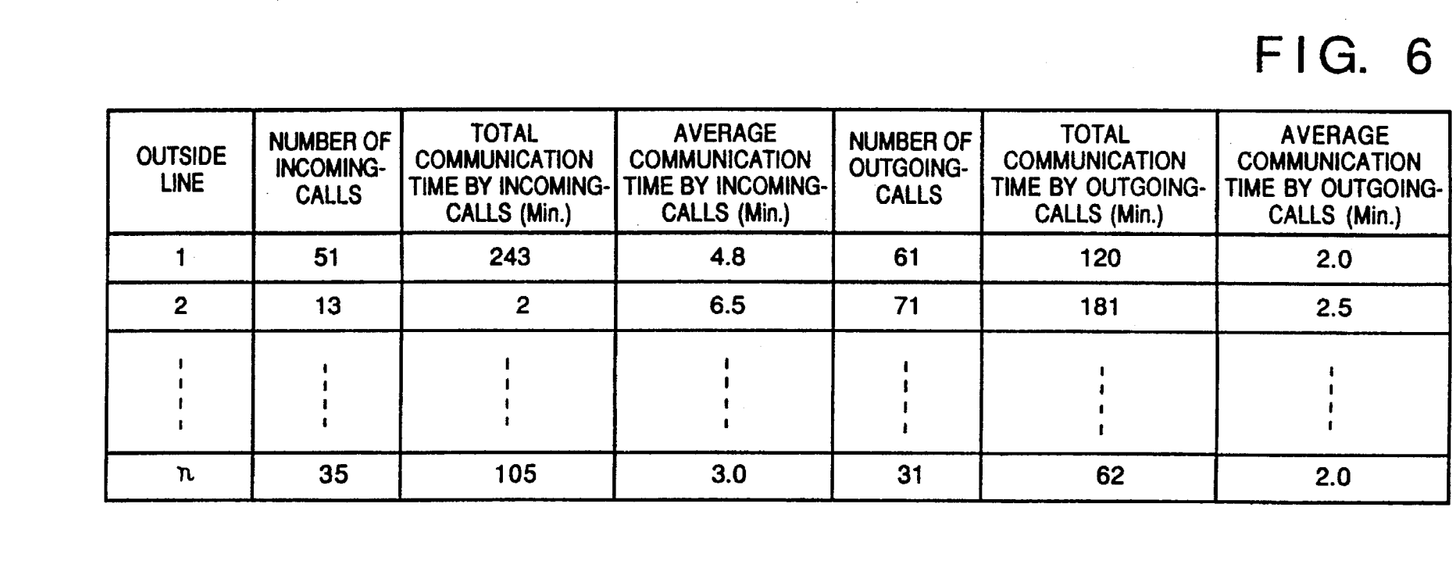
FIG. 6 illustrates an example of a table in which various data are stored in outside line units in a second embodiment.

FIG. 6 illustrates data structure of a table in which data of past outgoing calls and incoming calls per each outside line are stored.

In the table, the number of incoming calls, total time of communication by the incoming calls, average communication time by the incoming calls, the number of outgoing calls, total communication time by the outgoing calls and average communication time by the outgoing calls are stored corresponding to each outside line. Every time one of the outside lines is used, the main controller 10 updates the number and time in the corresponding cells.

Figure 7:
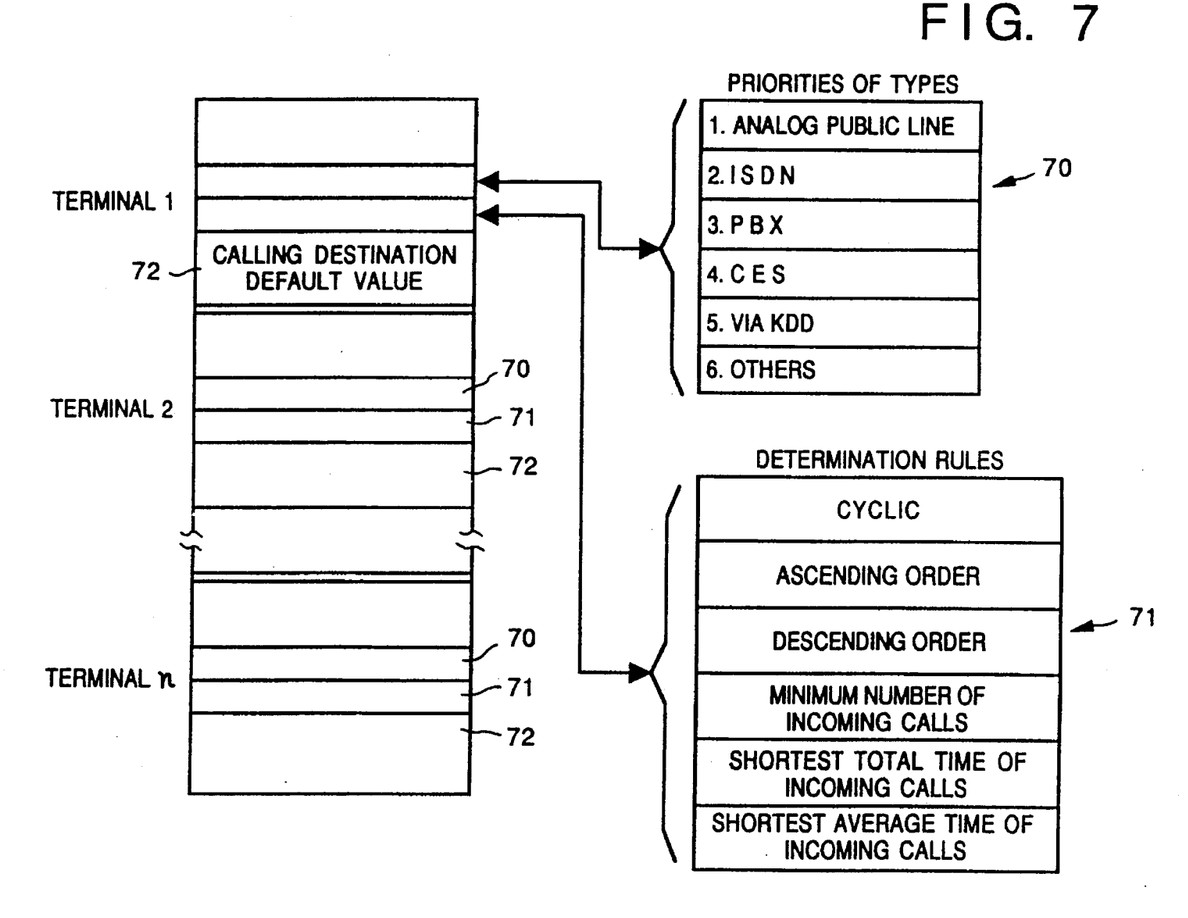
FIG. 7 illustrates an example of a table in which priorities and determination rules are stored corresponding to each terminal in the second embodiment.

FIG. 7 illustrates data structure of a table in the RAM 12, in which data corresponding to each terminal are stored.

As shown in FIG. 7, data 70 indicating the priorities in types of the outside lines, default value 72 indicating calling destination number and data 71 indicating rules for determining an outside line to be seized are stored in the table. This data can be freely set by a user with the dedicated telephone 21. If there is an outgoing call request from a terminal, the main controller 10 reads data corresponding to the terminal from the table, analyzes the data to select an appropriate outside line and seizes the line.

Figure 8:
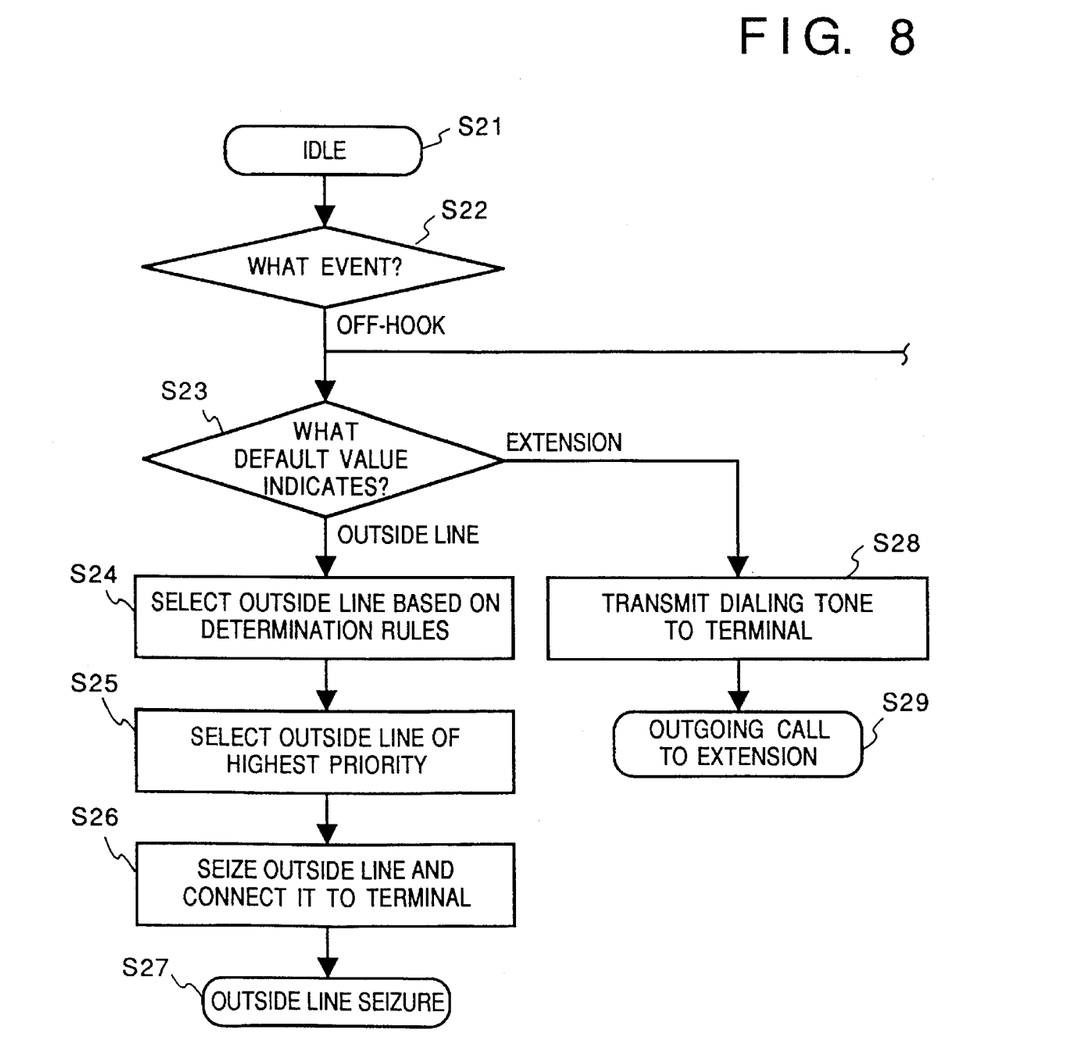
FIG. 8 is a flowchart showing outside line seizure based on the table shown in FIG. 7 in the second embodiment.

FIG. 8 is a flowchart showing outside line seizing operation in accordance with these data. The control program for this operation is stored in the ROM 11. In the following explanation, "off-hook" means status that a handset of a terminal in idle status is held up or a speaker key is pressed. The items "event" and "idle status" have the same meanings as in the first embodiment.

The operations shown in FIG. 8 are performed by the main controller 10 which manages statuses of each terminal.

In step S21, the terminals are in idle status, and occurrence of an "event" is awaited in step S22. If off-hook of a terminal is detected, the process proceeds to step S23, in which the default value 72 indicating the line set corresponding to the terminal is referred to. If the line is an outside line, the process proceeds to step S24 in which the determination rule data 71 for seizing an outside line is referred to and an outside line to be seized is selected in step S25. If the determination rule data 71 is the shortest total time of communication by incoming calls, the table shown in FIG. 6 is referred to and an outside line with the shortest total communication time by incoming calls is determined as the candidate of the line to be used. If there are outside lines with the same total time of communication by incoming calls, the priority data 70 is referred to and an outside line of the highest priority is selected. Thereafter, in step S26, the selected outside line and the terminal are connected, and the current status of the apparatus becomes "outside line seizure" in step S27, and operation of the dialing keys at the terminal are awaited.

In step S23, if the default value 72 indicates an extension, the process proceeds to step S28 in which a dialing tone is transmitted to the terminal to make an outgoing call to the extension set by the default value, next, in step S29, the current status changes to "outgoing call to extension". Note that the other processes are similar to conventional processes, therefore the explanations of the processes will be omitted.

Figure 9A:
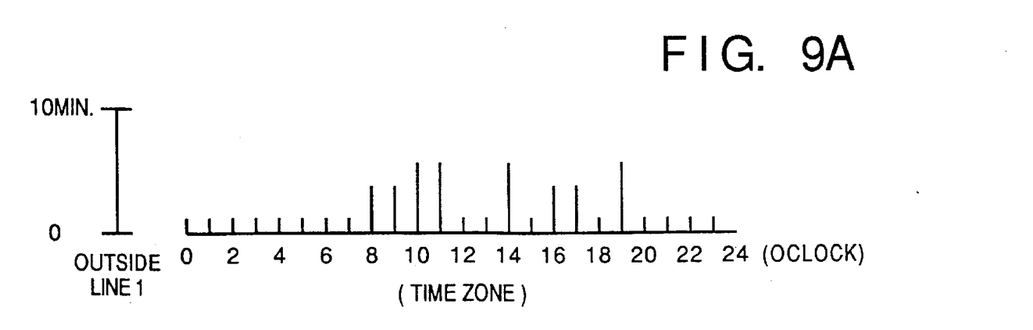
FIGS. 9A to 9C are histograms showing outside line using time per hour in the second embodiment.
Figure 9B:
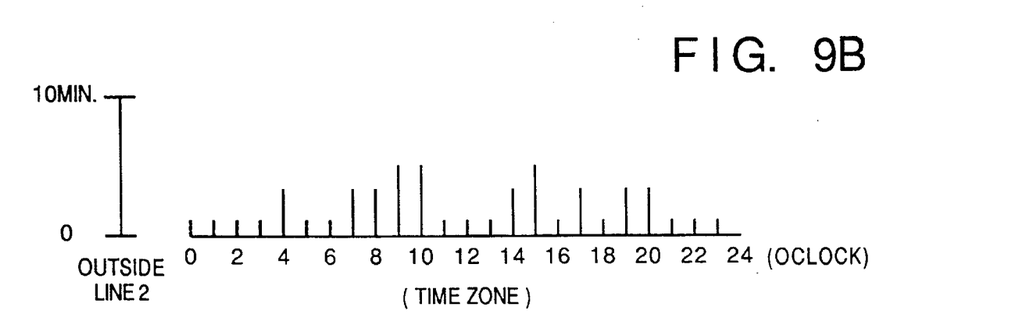
Figure 9C:
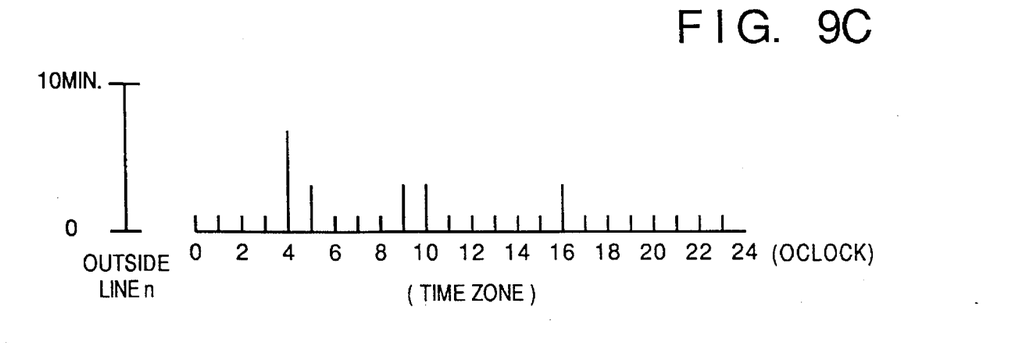

In the second embodiment as described above, histograms for the respective outside lines showing time of use in each time zone can be arranged. When an outgoing call is instructed, an outside line or the shortest time of use in the time zone is searched and selected as the outside line to be seized. FIGS. 9A to 9C respectively show such histograms indicating time of use of the outside lines Nos. 1, 2 and n.

As described above, according to this embodiment, in the key telephone apparatus connected to the PBX, as response method is set corresponding to the pattern of a calling signal from the PBX, the response method can be automatically changed in accordance with the calling signal. This arrangement enables the user of a terminal to discriminate from which line an incoming call comes only by listening to an incoming call tone. Further, an incoming call from a specific line can be automatically connected to a predetermined terminal.

According to the present invention, one of the accommodated plurality of outside lines is selected and seized for an outgoing call via the PBX, an appropriate outside line can be selected based on data of each line such as past incoming call time and the number of incoming calls. This arrangement can improve the outside line seizing rate by avoiding conflicts between outgoing calls and incoming calls.

As many apparently widely different embodiments of the present invention can be made without departing from the spirit and scope thereof, it is to be understood that the invention is not limited to the specific embodiments thereof except as defined in the appended claims.

What is claimed is:

1. A communication control apparatus connected to an exchange which exchange can generate different calling signals, comprising:

an analog line interface for receiving an incoming call and one of the different calling signals from the exchange;

a communication path switch for switching the incoming call received by said analog line interface among a plurality of communication terminals coupled to the exchange;

a controller for controlling said communication path switch;

a memory for storing switching information for switching said communication path switch according to one of the different calling signals; and an input device for setting the switching information into said memory, wherein said controller discriminates the one of the different calling signals received by said analog line interface, retrieves said switching information from said memory corresponding to the discriminated one of the different calling signals and controls said communication path switch to connect the incoming call to one of the communication terminals in accordance with the switching information retrieved from said memory.

2. The apparatus according to claim 1 further comprising a voice recorder, wherein said switching information includes at least information indicating whether the incoming call is connected to a predetermined one of the plurality of terminals or to the voice recorder.

3. The apparatus according to claim 1, wherein the switching information is provided by a dedicated communication terminal connected to the communication control apparatus.

4. The apparatus according to claim 1, wherein the signal pattern of said one of the different calling signals depends upon the particular line on which the incoming call is received.

5. A communication control apparatus connected to an exchange which exchange can generate different calling signals, comprising:

an analog line interface connected to plural lines for receiving an incoming call and one of the different calling signals from the exchange;

a communication path switch for switching the incoming call received by said analog line interface among a plurality of communication terminals coupled to the exchange;

a controller for controlling said communication path switch; and a memory for storing switching information for switching said communication path switch according to both the different calling signals and an analog outside line from which the incoming call is received, wherein said controller discriminates both the one of the different calling signals received by the analog line interface and the analog line from which the incoming call is received, retrieves the switching information corresponding to the discriminated one of the different calling signals from said memory and the analog line from which the incoming call is received, and controls said communication path switch so that the incoming call is connected to one of the plurality of communication terminals in accordance with the switching information retrieved from said memory.

6. A communication control method for controlling a communication control apparatus connected to an exchange, the exchange accommodating a plurality of lines and the communication control apparatus calling a communication terminal connected to the apparatus in accordance with a calling signal from the exchange, comprising the steps of:

discriminating a format of the calling signal from the exchange and an outside line on which an incoming call is input;

determining a response process for the calling signal from the exchange in accordance with response information pre-stored in a memory, corresponding to result of discrimination, and setting the response information into the memory.

7. The method according to claim 6, wherein the response information stored for the response process includes at least information indicating whether the response process is a response restricting the calling signal to predetermined communication terminals or an audio message response from a voice recorder.

8. The method according to claim 6, wherein the response information stored for the response process is provided by a dedicated communication terminal connected to the communication control apparatus.

9. A communication exchange apparatus which accommodates a plurality of outside lines and which selects one of the outside lines for an outgoing call originating from an extension and seizes the selected outside line, comprising:

memory means for storing information relating to a number of incoming calls which have been received from each one of the plurality of outside lines or a time period each one of the plurality of outside lines has been occupied in communication;

selection means responsive to the information stored in said memory means for the outgoing call originating from the extension for selecting one of the plurality of outside lines; and connecting means for connecting the outside line selected by said selection means to the extension originating the outgoing call.

10. The apparatus according to claim 9, wherein said memory means further includes priority information indicating a hierarchical order of selection of the outside lines, and said selection means selects an outside line to be connected in accordance with the priority information.

11. A communication exchange method for seizing one of a plurality of outside lines coupled to an exchange by off-hook operation at one of a plurality of extension terminals of the exchange, comprising the steps of:

storing information representative of a total time of incoming call communication to the extension terminals from each of the outside lines or a number of incoming calls which have been received by the extension terminals from each of the outside lines; and selecting an outside line to be seized responsive to the stored total incoming call communication time or number of received call representative information.

12. The method according to claim 11, wherein in said selection step, an outside line corresponding to the least total incoming call communication time or the least number of received incoming calls is selected.

13. The method according to claim 11, wherein the representative information further includes priority information indicating an hierarchical order of selection of the outside lines, and in said selection step, an outside line is selected in accordance with the priority information.

14. The method according to claim 11, wherein the representative information further includes an average value of a time of incoming call communication to the extension terminals from each of the outside lines.

15. A communication exchange method for seizing an arbitrary outside line among a plurality of outside lines of an exchange based on an off-hook operation at an extension terminal, comprising the steps of:

judging whether the off-hook operation is an instruction for an outgoing call to an outside line;

responsive to pre-stored information relating to either of a total time of incoming call communication through each of the outside lines or a number of incoming calls which have been received through each of the outside lines and to a communication priority of each of the outside lines, first selecting an outside line, of which at least either of the total received incoming call time or the number of received incoming calls is the least, if the off-hook operation is the instruction for an outgoing call to an outside line;

selecting an outside line of a highest communication priority based on the pre-stored information if an outside line cannot be selected in said first selection step; and connecting the selected outside line to the extension.

* * * * *